United States Patent
Hammons, Jr.

(10) Patent No.: US 8,671,332 B2
(45) Date of Patent: Mar. 11, 2014

(54) SYSTEMS AND METHODS FOR A RATELESS ROUND ROBIN PROTOCOL FOR ADAPTIVE ERROR CONTROL

(75) Inventor: A. Roger Hammons, Jr., N. Potomac, MD (US)

(73) Assignee: The Johns Hopkins University, Baltimore, MD (US)

( * ) Notice: Subject to any disclaimer, the term of this patent is extended or adjusted under 35 U.S.C. 154(b) by 587 days.

(21) Appl. No.: 12/770,307

(22) Filed: Apr. 29, 2010

(65) Prior Publication Data

US 2010/0281331 A1 Nov. 4, 2010

Related U.S. Application Data

(60) Provisional application No. 61/174,098, filed on Apr. 30, 2009.

(51) Int. Cl.
*H03M 13/00* (2006.01)

(52) U.S. Cl.
USPC ........... 714/776; 714/758; 714/749; 370/204; 370/474; 370/449

(58) Field of Classification Search
USPC ........... 370/204, 474, 449; 714/749, 758, 776
See application file for complete search history.

(56) References Cited

U.S. PATENT DOCUMENTS

| | | | |
|---|---|---|---|
| 6,532,211 B1 * | 3/2003 | Rathonyi et al. | 370/230 |
| 6,700,893 B1 | 3/2004 | Radha et al. | |
| 7,027,782 B2 | 4/2006 | Moon et al. | |
| 7,106,701 B2 | 9/2006 | Stumpert et al. | |
| 7,225,384 B2 | 5/2007 | Heo et al. | |
| 7,284,179 B2 | 10/2007 | Jiang | |
| 7,292,562 B2 | 11/2007 | Wu et al. | |
| 7,369,517 B2 | 5/2008 | Dillinger et al. | |
| 7,594,153 B2 | 9/2009 | Kim et al. | |
| 2002/0080719 A1 | 6/2002 | Parkvall et al. | |
| 2003/0147348 A1 * | 8/2003 | Jiang | 370/229 |
| 2003/0159099 A1 | 8/2003 | Vukovic et al. | |
| 2005/0160293 A1 * | 7/2005 | Ramaiah et al. | 713/201 |
| 2005/0160478 A1 * | 7/2005 | Ramaiah et al. | 726/14 |
| 2006/0179392 A1 * | 8/2006 | Ota | 714/749 |
| 2006/0282739 A1 * | 12/2006 | Meyer et al. | 714/748 |
| 2008/0002565 A1 * | 1/2008 | Spencer | 370/204 |
| 2008/0056303 A1 * | 3/2008 | Sebire et al. | 370/474 |
| 2008/0274698 A1 * | 11/2008 | Li et al. | 455/63.1 |

(Continued)

FOREIGN PATENT DOCUMENTS

EP 1780926 A1 * 5/2007

*Primary Examiner* — Joshua P Lottich
*Assistant Examiner* — Jeison C Arcos
(74) *Attorney, Agent, or Firm* — Noah J. Hayward

(57) ABSTRACT

Systems and methods implementing a protocol that provides reliable transport over a point-to-point link characterized by deep and sustained fades. Such a communications link may be a free space optical channel or may be a radio frequency point-to-point channel. Data frames are processed through a circular data buffer that operates in a round robin fashion at a transmission node. The coding and forward error correction processes allow for continued operation in spite of possible signal fades due to atmospheric turbulence or other causes. At a receive node, incoming data is also saved in a circular buffer. A re-acknowledgment list is maintained at the receive node for tracking recently received and decoded data. This allows for a new acknowledgment to be sent in the event that a previously sent acknowledgment failed to reach the transmission node.

25 Claims, 11 Drawing Sheets

(56) References Cited

U.S. PATENT DOCUMENTS

| | | | |
|---|---|---|---|
| 2008/0279211 A1 * | 11/2008 | Chitrapu et al. ............ 370/449 |
| 2008/0298242 A1 | 12/2008 | Fan et al. |
| 2008/0320356 A1 | 12/2008 | Tokita |
| 2009/0204866 A1 | 8/2009 | Mishuku |

* cited by examiner

SYSTEMS AND METHODS FOR A RATELESS ROUND ROBIN PROTOCOL FOR ADAPTIVE ERROR CONTROL

CROSS REFERENCE TO RELATED APPLICATIONS

This application is related to prior filed U.S. Provisional Application No. 61/174,098, filed on Apr. 30, 2009 which is incorporated herein by reference in its entirety.

STATEMENT OF GOVERNMENTAL INTEREST

This invention was made with U.S. Government support under the U.S. Air Force under contract number FA8650-04-D2413. The U.S. Government has certain rights in the invention.

BACKGROUND OF THE INVENTION

1. Field of the Invention

The invention described herein relates to communications systems, and in particular relates to communications protocols.

2. Description of Related Art

Free-space optical or radio frequency communications systems may be viewed as networks of high capacity point-to-point links, providing a transport capability that may be comparable to a fiber optic backbone network. Due to the backbone nature of such a network, there is a requirement for reliable transport over long distances. Such a communications system must cope with atmospheric turbulence, however. Atmospheric phenomena may cause signal fades whose durations are often orders of magnitude greater than a symbol interval. Moreover, high signaling rates require protocols that are efficient and are of relatively low complexity.

There is a need, therefore, for a communications protocol that allows for high capacity, reliable transport, where the protocol allows for continued operation in spite of atmospheric conditions.

BRIEF SUMMARY OF THE INVENTION

The systems and methods described herein implement a protocol that provides reliable transport over a point-to-point link characterized by deep and sustained fades. Such a communications link may be a free space optical channel or may be a radio frequency channel. Data frames are processed through a circular data buffer that operates in a round robin fashion at a transmit node. The coding and forward error correction processes allow for continued operation in spite of possible signal fades due to atmospheric turbulence or other causes. At a receive node, incoming data is also saved in a circular buffer. A reacknowledgment list is maintained at the receive node for tracking recently received and decoded data. This allows for a new acknowledgment to be sent in the event that a previously sent acknowledgment failed to reach the transmission node.

BRIEF DESCRIPTION OF THE DRAWINGS/FIGURES

Further embodiments, features, and advantages of the present invention, as well as the operation of the various embodiments of the present invention, are described below with reference to the accompanying drawings.

DETAILED DESCRIPTION OF THE INVENTION

Figure 1:
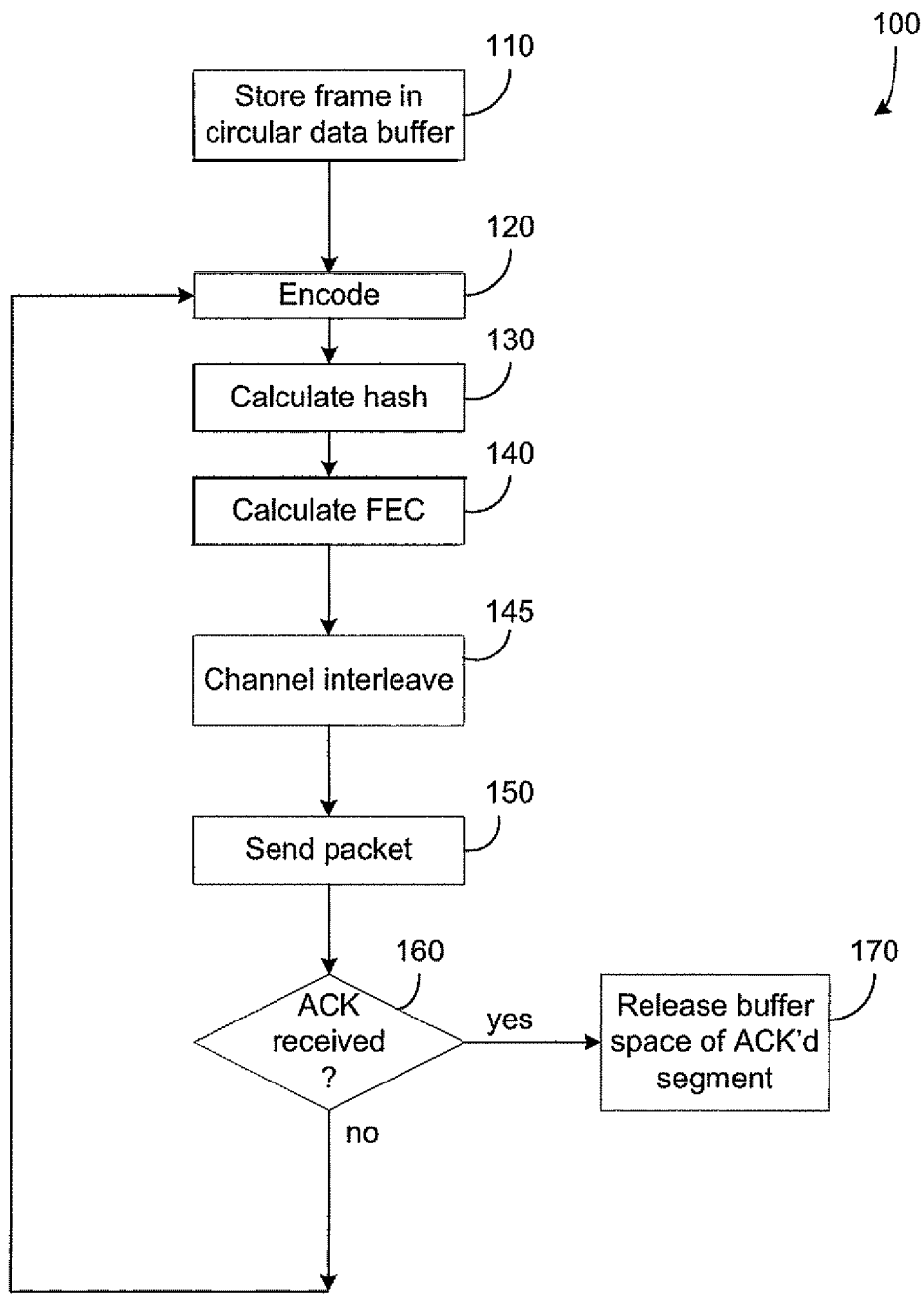
FIG. 1 is a flowchart illustrating processing performed at a transmission node, according to an embodiment of the invention.

A preferred embodiment of the present invention is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

In an embodiment of the invention, the operation of the transmitter comprises three stages that are executed continuously while data remain to be sent: (1) Manage flow of data segments into and out of a transmission buffer; (2) Select a frame in the transmission buffer for transmission processing; and (3) Prepare and transmit a new packet for a selected frame in the circular buffer. Data segments are accepted into the circular buffer whenever it has room to accommodate a new data segment. Data segments are deleted from the circular buffer whenever acknowledgements are received indicating that they have been successfully delivered to the receiving node. Frames are selected from the transmission buffer in a circular or round robin fashion. New packets are prepared by encoding portions of the data segment associated with the selected frame using a combination of incremental redundancy and error control coding techniques. Details regarding these operations are provided in subsequent paragraphs, including those discussing FIGS. 1, 2, 3, 4, 9, and 10.

In an embodiment of the invention, the operation of the receiver comprises the following stages performed in a continuous fashion while data is being received: (1) Receive a packet and determine its correctness; (2) Update the receiver's circular buffer with data correctly received; (3) Decode a corresponding data segment if sufficient data regarding the segment have been collected from the packets received; (4) Send an acknowledgement and release buffer space for decoded data segments. The received packet is decoded based on error control coding, which determines whether or not the contents are correctly received. If correctly received, the packet includes an identifier for the data segment to which the data pertains. The data is aggregated in the receiver's circular buffer in the frame associated with the corresponding data segment. If the aggregated data is sufficient to allow the data segment to be decoded, the data segment is decoded and delivered to the end user. An acknowledgement is sent back to the transmit node and the data associated with the decoded data segment are removed from the receiver's circular buffer. Details regarding these operations are provided in subsequent paragraphs, including those describing FIGS. 5, 6, 7, 8, 9, and 11.

The overall processing of a transmission node is illustrated in FIG. 1, according to an embodiment of the invention. At 110, data is stored in a circular data buffer. The data may be organized as frames in the buffer; the data stored in a given frame is referred to herein as a data segment. Each frame consists of a data segment S, a data segment identifier I(S), and a seed value dependent on the data segment, $\kappa(S)$. In an embodiment, the identifier I(S) is a sequential counter for segments received from the source, with I(S)=1 for the first segment, I(S)=2 for the second segment, and so forth. The identifier may be allocated a fixed number of bytes to represent the counter value. In this case, the length of the counter should be sufficient to ensure with high probability that the identifiers associated with distinct segments in the circular buffer are unique; that is, the counter should not wrap-around back to the value 1 until the previous segment labeled 1 has been successfully transmitted to the destination and is therefore no longer being processed by the transmit node.

At 120, one or more packets are encoded according to a process to be described below. The payload of the packet represents at least a portion of the data segment S, along with the segment identifier I(S) and $\kappa(S)$. In an embodiment of the invention, whenever the transmit node sends a packet, it first forms a pseudorandom linear combination $\bar{d}$ of the rows of S, the coefficients from the finite field $GF(2^m)$ being determined by the seed $\kappa(S)$, and then produces a labeled encoded vector $v=L(I(S), \kappa(S), d)$, where the function L denotes the labeling operation. In an embodiment, the labeling operation consists of concatenating the bits associated with the identifier I(S), seed $\kappa(S)$, and linearly combined data d.

In an embodiment, the seed $\kappa(S)$ may be the actual seed of a conventional pseudorandom number generator (PRNG) and would be used and updated in accordance with the PRNG algorithms. In another embodiment, the seed $\kappa(S)$ may be the index into a suitable look-up table whose rows contain the coefficient vectors to be used in creating the linear combinations from the data segments. In this case, the seed is updated by incrementing the index to look at the next row of the coefficients table. The role of the seed value is described in greater detail below. The data segment consists of gN source symbols logically organized as a g×N matrix with rows $\bar{s}_1$, $\bar{s}_2$, $\bar{s}_3, \ldots \bar{s}_g$. Each source symbol comprises m bits and represents an element in the finite Galois field $GF(2^m)$.

At 130, a hash value h(v) is calculated as a function of the labeled encoded vector v. In an embodiment of the invention, this hash value may be a cyclic redundancy code (CRC). In another embodiment of the invention, the hash value may be produced by a cryptographic hash function. The hash value is used for error detection purposes, and is included with the packet for transmission to the receive node. The receive node will compute its own hash of the packet and compare this computed hash to the received hash. If the two agree, the receive node concludes that the packet has been correctly received; otherwise, the receive node concludes that the packet has been received in error and drops the packet.

At 140, forward error correction (FEC) is applied to the vector and its hash collectively, according to an embodiment, to produce the code word c=g(v, h(v)). The FEC may be based on any channel coding technology known to persons of ordinary skill in the art, such as BCH codes, Reed-Solomon codes, convolutional codes, Turbo codes, low-density parity check (LDPC) codes, or combinations and variations thereof. In an embodiment, the channel coding may be trivial, meaning that the encoder g is the identity mapping. In such an embodiment, the vector c=(v, h(v)) is sent uncoded, so this processing stage may be omitted. The primary purpose of the FEC is to remove random errors introduced by noise on the channel. In an embodiment of the invention, the channel interleaving at 145 is used to randomize the error bursts induced by a fading channel to make the channel coding more effective. Since typical error bursts could easily overwhelm the error correction capability of a channel code if it were contained in a single codeword, channel interleaving 145 can be used to attempt to break the error bursts into multiple pieces and spread them across multiple codewords, such that each piece will be individually correctable. At 145, according to an embodiment, the channel interleaving acts on one or more code words $c_1, c_2, \ldots, c_d$ to produce interleaved vectors $u_1, u_2, \ldots, u_d$ of the same bits but in possibly different order. Each of the interleaved vectors are processed into packets and transmitted in turn. Let $u=P(c_1, c_2, \ldots, c_d)$ denote a particular interleaved output vector for which a packet is to be formed at a given transmit opportunity. Here P denotes the permutation and selection function implemented by interleaver logic for this output vector. In certain embodiments, the channel interleaving may be trivial, meaning that d=1 and P is the identity function so that u=c. In other embodiments, non-trivial channel interleaving (i.e., with d>1 and P not the identity function) could be advantageous and would be included as a specific processing step.

At 150, the interleaved vector u is formatted into a packet p=f(u), which is modulated and transmitted to the receive node. In an embodiment, the formatting function f includes the addition of any overhead symbols that might be needed by the modem, such as for frame synchronization or channel estimation. For convenience of notation, the packet will also be denoted p=F(I(S), k(S), d) where the function F encompasses the composite action of the hash calculation 130, FEC calculation 140, interleaving 145, and packet formatting. Typically, a number of packets will need to be used to transmit the data segment completely and successfully. Each packet will be sent in its own transmission.

At 160, a determination is made as to whether an acknowledgment (ACK) has been received for a data segment. If so, then in 170, the space in the circular buffer that had been used to store the data segment is released in an embodiment of the invention.

If, at 160, a determination is made that no acknowledgment has yet been received, then a new packet will be prepared for the data segment when it is processed again in the circular buffer. In this case, encoding of a new packet at 120 will be performed with an updated seed $\kappa(S)$ and a new pseudorandom coefficient vector determined by the new seed.

Figure 2:
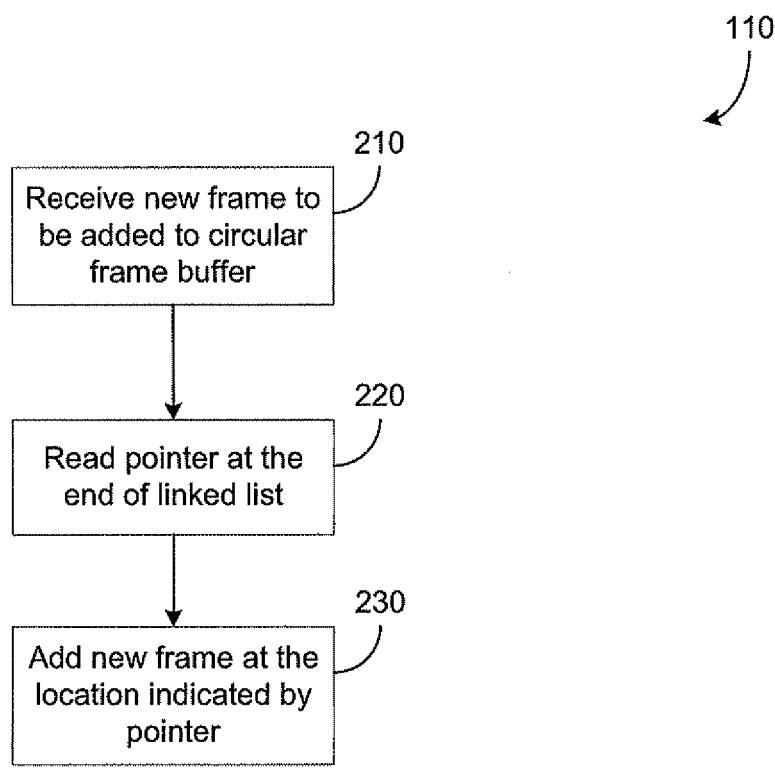
FIG. 2 is a flowchart illustrating the storage of new frames in a circular data buffer, according to an embodiment of the invention.

The process of storing a frame in the circular data buffer at the transmit node is illustrated in FIG. 2, according to an embodiment of the invention. At 210, a new data segment is received for addition to the circular frame buffer. The circular nature of the buffer is maintained by use of indirect addressing since the physical memory associated with the buffer will be utilized in a random fashion. This is due to the intermittent nature of the channel. Since channel outages occur as a random process, frames in the circular buffer will be released in arbitrary manner as data segments are successfully delivered and acknowledged. In an embodiment of the invention, the circular frame buffer is implemented as a linked list, in which pointers are used to implement the indirect addressing. In such an implementation, each entry in the list includes a frame, plus a pointer to the next entry of the linked list. The nominal beginning of the linked list is indicated by a head pointer. The nominal end of the linked list is indicated by a tail pointer. At 215, an open frame is located in the circular buffer. At 220, the linked list pointers are updated to include the new frame so that the tail pointer now points to the said new frame. At 230, the new data segment is stored in the circular buffer at the frame indicated by the tail pointer.

Figure 3:
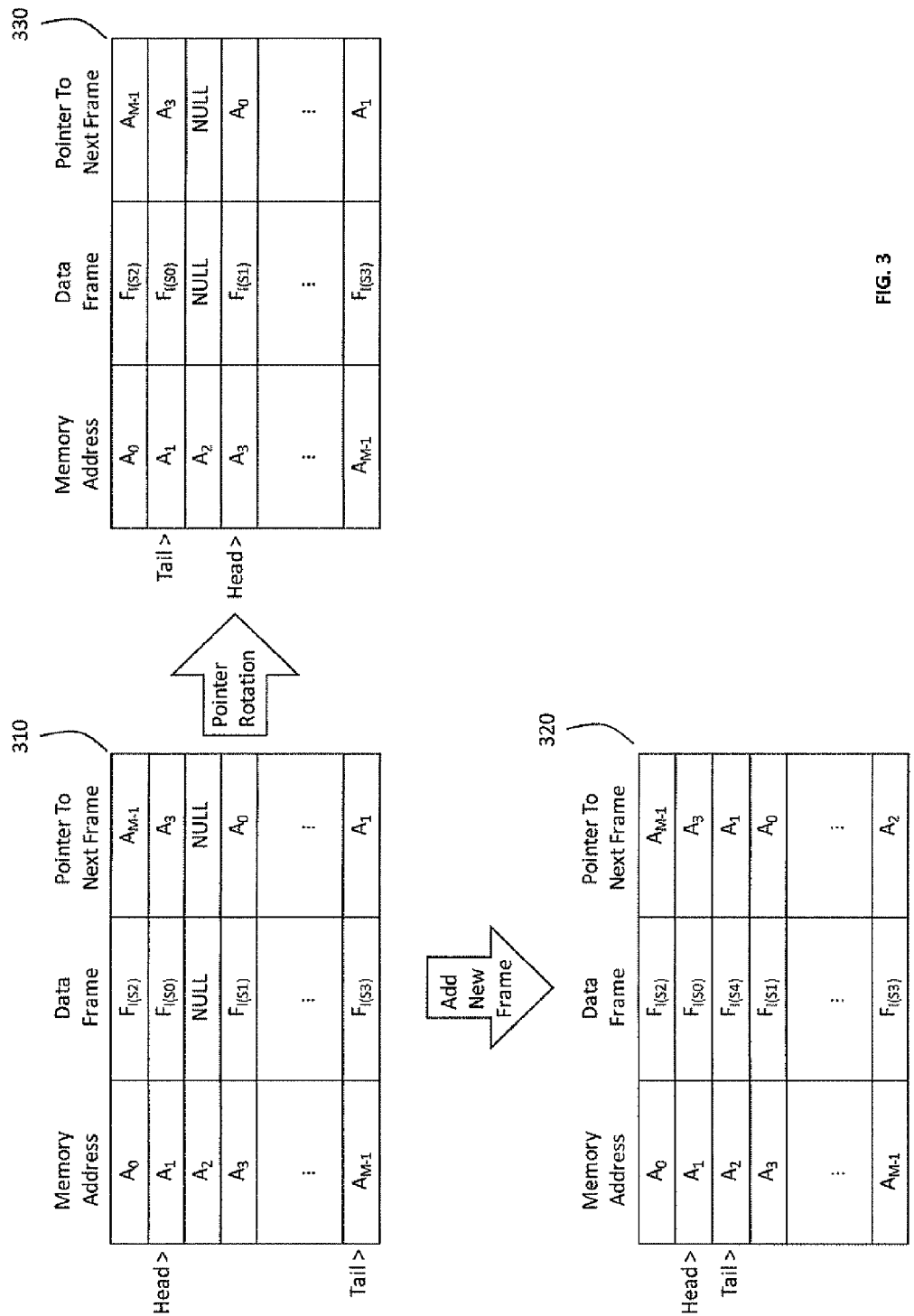
FIG. 3 illustrates the manipulation of pointers in a circular data buffer, according to an embodiment of the invention.

The addition of a new frame to the circular buffer is illustrated further in FIG. 3, according to an embodiment of the invention. The first circular buffer is shown as linked list 310. In the diagram, the memory addresses associated with the start of frames in the circular buffer are shown in the first column as addresses $A_0, A_1, A_2, \ldots, A_{M-1}$. As shown in the second column, there are four occupied frames $F_{1(S0)}, F_{1(S1)}, F_{1(S2)}, F_{1(S3)}$ in the buffer, corresponding to data segments S0, S1, S2, S3, which are not necessarily consecutive. The buffer frame starting at address $A_2$ is empty as indicated by the NULL entries. The third column shows the linked list pointers associated with the occupied frames; these pointers provide the address of the next frame following the current frame. The annotations "head" and "tail" denote respectively the frames at the logical start of the buffer (to be processed next) and logical end of the buffer (after which new frames can be added). The circular nature of the buffer may be understood by following the pointers: The first frame is $F_{1(S0)}$ at address $A_2$; the next frame is $F_{1(S1)}$ at address $A_3$; the next frame is $F_{1(S2)}$ at address $A_0$; the next frame is $F_{1(S3)}$ at address $A_{M-1}$; the next frame is back to $F_{1(S0)}$ at address $A_2$; and so forth.

If a new frame is added, the result is shown as linked list 320. Since in the linked list 310, there is an empty frame location at address $A_2$, the new frame $F_{1(S4)}$ can be stored at this location. Note that the tail pointer now points to address $A_2$; the next-frame pointer at $A_2$ points to the head at address $A_1$; and the next-frame pointer at address $A_{M-1}$ (the former tail) now points to address $A_2$ instead of $A_1$. There are different mechanisms that might be used to determine if there are open frames available and to identify a particular open frame to accommodate an incoming data segment. In an embodiment, the addresses of open frames are stored in a stack. When frames become available, their addresses are pushed on the stack. When an open frame is needed, an address of such a frame, if available, is popped off the stack. In an alternative embodiment, the buffer uses flags to indicate, for each frame address in the buffer, whether it is available or not. These flags are scanned to determine the next available open frame, if any. In an embodiment, the flags can be special bits in each frame that are set and reset depending on its availability. In another embodiment, a certain data segment identifier, such as the all-zero identifier, might be singled out to flag an invalid segment and thus also indicate an available open frame in the buffer.

Note that if there is no new data segment added to the circular buffer (because either there is no new data presented or the circular buffer is full), then in an embodiment of the invention the pointers in the linked list are rotated to cycle through the frames in the buffer in a circular fashion. Pointer rotation is illustrated in FIG. 3. Here, in the linked list 330, the head pointer has changed so that it now points to the frame at address $A_3$, the successor indicated by the frame at address $A_1$ (the former head). The tail pointer now points to the frame at address $A_1$ (the former head). In an embodiment, the frame pointed to by the head pointer is the one processed during the current packet transmission opportunity. Such pointer rotation provides for steady-state round-robin processing of the circular buffer.

The indirect addressing required to create and maintain the circular buffer may be implemented by other techniques as well. In an alternative embodiment, the frames in the buffer may be assigned a key $\tau(S)$ that serves as a time stamp for each processing of the data segment. The key $\tau(S)$ is similar to the identifier $I(S)$ in that it could be implemented as a sequentially updating global counter and should be unique among the data segments in the circular buffer. It is different in that, while the identifier is assigned once and does not change for the lifetime of the data segment, the key is updated every time a new packet is generated for the data segment. In this embodiment, the data segment in the circular buffer with the oldest time stamp is identified and processed whenever a new packet is to be created and transmitted. The oldest time-stamp thus serves the same role as the head pointer in the linked list implementation. Similarly, assigning the most recent time-stamp to a newly arriving packet effectively assigns it to the end of the circular buffer, similar to the use of the tail pointer in the linked list implementation.

In another embodiment of the invention, the indirect addressing could be accomplished through the use of individual timers assigned to each frame. In an embodiment, a countdown timer is set to a maximum value when a new data segment enters the circular buffer. The timers for all frames in the circular buffer count down in a synchronous fashion. When the timer expires (i.e. reaches a minimum value), the corresponding frame is processed by preparing a new packet for transmission from the corresponding data segment. Once the new packet is transmitted, the timer from that frame is reset to the maximum value. Timer expiry therefore serves to identify the proper frame to process in the same way that finding the oldest time-stamp does in the previously described alternate embodiment.

Figure 4:
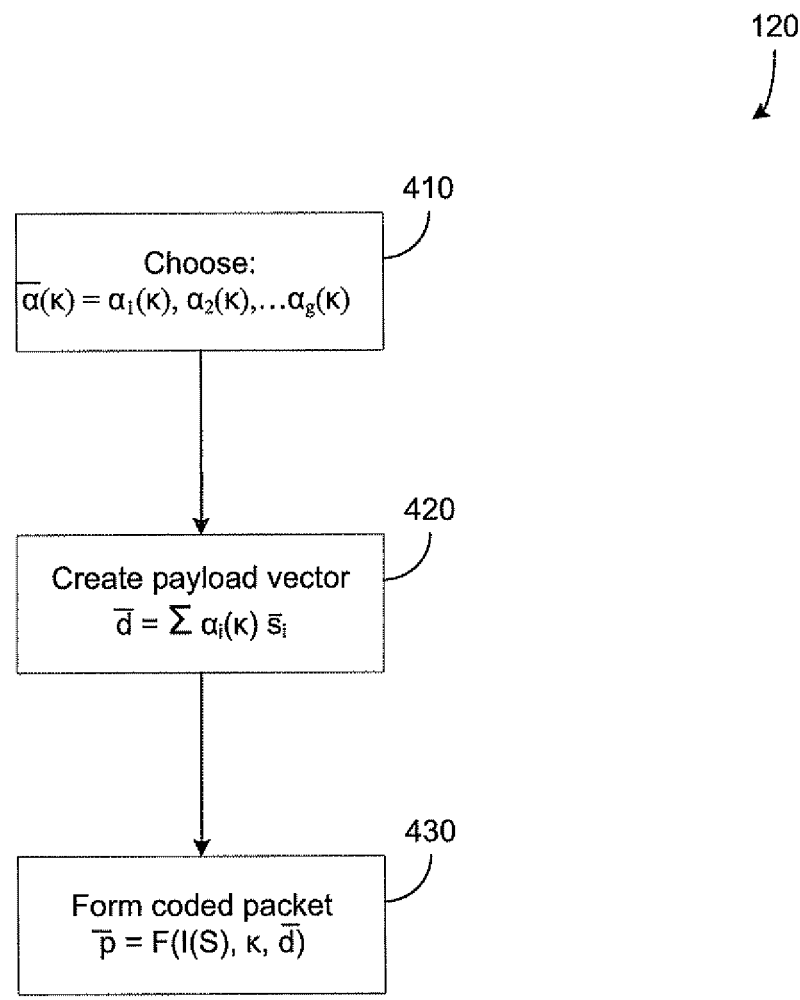
FIG. 4 is a flowchart illustrating the coding of the packet at a transmission node, according to an embodiment of the invention.

The process of encoding a packet for network transmission is shown in greater detail in FIG. 4, according to an embodiment of the invention. As discussed above, data is processed in blocks of g words, each word consisting of N symbols from the finite field $GF(2^m)$. The data segment therefore consists of the vectors $\bar{s}_1, \bar{s}_2, \bar{s}_3, \ldots \bar{s}_g$ where each $\bar{s}_i$ is an N-tuple of elements from the finite field $GF(2^m)$. At 410, a pseudorandom vector $\bar{\alpha}(\kappa) = \alpha_1(\kappa), \alpha_2(\kappa), \ldots \alpha_g(\kappa)$ of coefficients from $GF(2^m)$ is chosen, based on the seed $\kappa(S)$. At 420, a payload vector is created, $\bar{d} = \Sigma \alpha_i(\kappa)\bar{s}_i$, where $i=1, \ldots g$. At 430, a coded packet is formed, $\bar{p} = F(I(S), \kappa, \bar{d})$. Preferably, the pseudorandom generation produces a set of g vectors that are linearly independent with a high probability.

In an embodiment of the invention, the pseudorandom generation of coefficient vectors is performed in real time by using a PRNG to select elements from the finite field. There are many PRNGs available as would be understood to a person of ordinary skill in the art, including PRNGs used in cryptography and in Monte Carlo simulations. PRNGs usually implement a mathematical recursion to determine a pseudo-random number from a given input called the seed and to update the seed so that a different pseudo-random number will be produced each time the PRNG is executed. Preferably, the period of the recursion should be large enough that new coefficient vectors will be selected for each transmission associated with a given data segment. In this embodiment, each data segment is assigned an initial seed value when the segment is first accepted into the circular buffer. The initial seed value may be the same for all data segments. After each data segment is processed for transmission of a new packet, the seed is updated in accordance with the PRNG algorithm, and the new seed is stored with the data segment in the circular buffer for use in the generation of the next coefficient vector for the data segment.

In an alternative embodiment of the invention, the coefficient vectors may be generated off-line and made available through a suitable lookup table. In this embodiment, the seed $\kappa(S)$ is the index used to look up the coefficient vector in the table. As each segment S is accepted into the circular buffer, the associated seed $\kappa(S)$ is initialized to the first index in the table and is stored with the data segment in the circular buffer. After each linear combination d is formed from data segment S, the corresponding seed $\kappa(S)$ is incremented to the next table location, and the new value is stored with the data segment in the circular buffer. The seed wraps around to the first location in the table after the last table location has been used.

Figure 5:
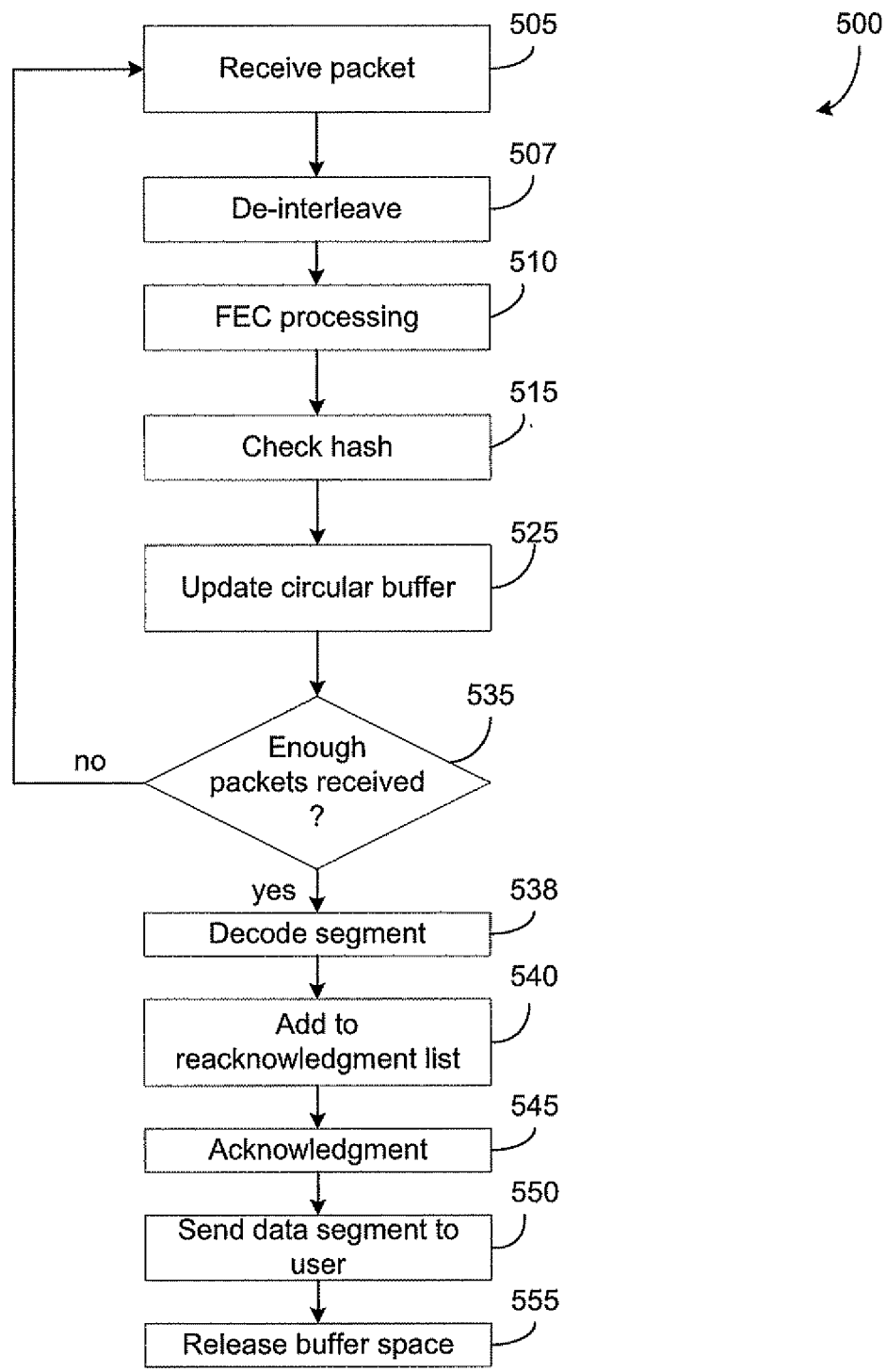
FIG. 5 is a flowchart illustrating processing performed at a receive node, according to an embodiment of the invention.

FIG. 5 illustrates the overall processing of a receive node according to an embodiment of the invention. At 505, a packet is received. At 507, de-interleaving is performed. At 510, forward error correction decoding is performed. At 515, the hash value accompanying the packet is checked. If the check of the hash value succeeds, then at 525 the receive node's circular buffer is updated with the data from the successfully received packet, as will be described in greater detail below.

At 535, a determination is made as to whether enough packets have been received to reconstitute the data segment. If not, then processing returns to 505 for reception of another packet. If enough packets have been received to reconstitute the data segment, then processing continues to 538, where the segment is decoded, as will be described in greater detail below. At 540, the identifier I(S) for the data segment is added to a reacknowledgment list, whose purpose will be described below. At 545, an acknowledgment is issued to the transmit node. At 550, the decoded data segment is sent to a user, and at 555 the buffer space for the data segment is released.

Given that the receive node will release the buffer space used to store the decoded data segment when the acknowledgment is sent, a problem arises if the transmit node does not receive the acknowledgment message due to a loss of the return acknowledgment packet. In this case, the transmit node will send a new packet for the data segment. Having decoded and acknowledged the original data segment, the receive node no longer tracks the status of this segment. As a result, the receive node will interpret the newly sent packet as the start of a new session. This would then lead to the complete re-transmission of the data segment, with duplicate data being delivered to the end user.

To preempt this event, in an embodiment of the invention the receive node maintains a list of the identification numbers of data segments recently decoded. This is the reacknowledgment (reACK) list. Unlike the buffer, the reacknowledgement list contains only the identifiers, not the data, of data segments. Whenever a packet is received with data segment identifier I(S), the receive node checks to see if its circular buffer already contains data for that data segment. If so, the new data from the packet is added to the buffer. If the new data is sufficient to allow decoding of the associated data segment, the segment is decoded and an ordinary acknowledgment is sent. If no data for I(S) is in the buffer, however, the receive node next checks the reacknowledgment list. If found in the list, the identifier is sent for inclusion in the acknowledgement field of the next available outgoing packet from the receive node to the transmit node. If the identifier is found in neither the buffer nor the reacknowledgement list, the packet is accepted as the start of transmissions for a new data segment.

Generally, the reacknowledgment list need not be complete in an embodiment of the invention. In this list, each identifier I(S) is assigned a persistence value. When a new identifier is added to the reacknowledgement list, it is given a maximum persistence value. Every time a packet is received, the persistence values in the reacknowledgment list are decremented. An identifier is removed from the list when its persistence value reaches a minimum value. Whenever a packet is received whose identifier is in the reacknowledgment list, the corresponding persistence value is incremented. In an embodiment, the persistence value in this case is incrementing by restoring it to the maximum value. If the list is full when a new identifier needs to be added, the new identifier overwrites the entry with the lowest persistence value. This allows the receive node to remember those data segments that are most likely to be in need of a future reacknowledgment.

Figure 6:
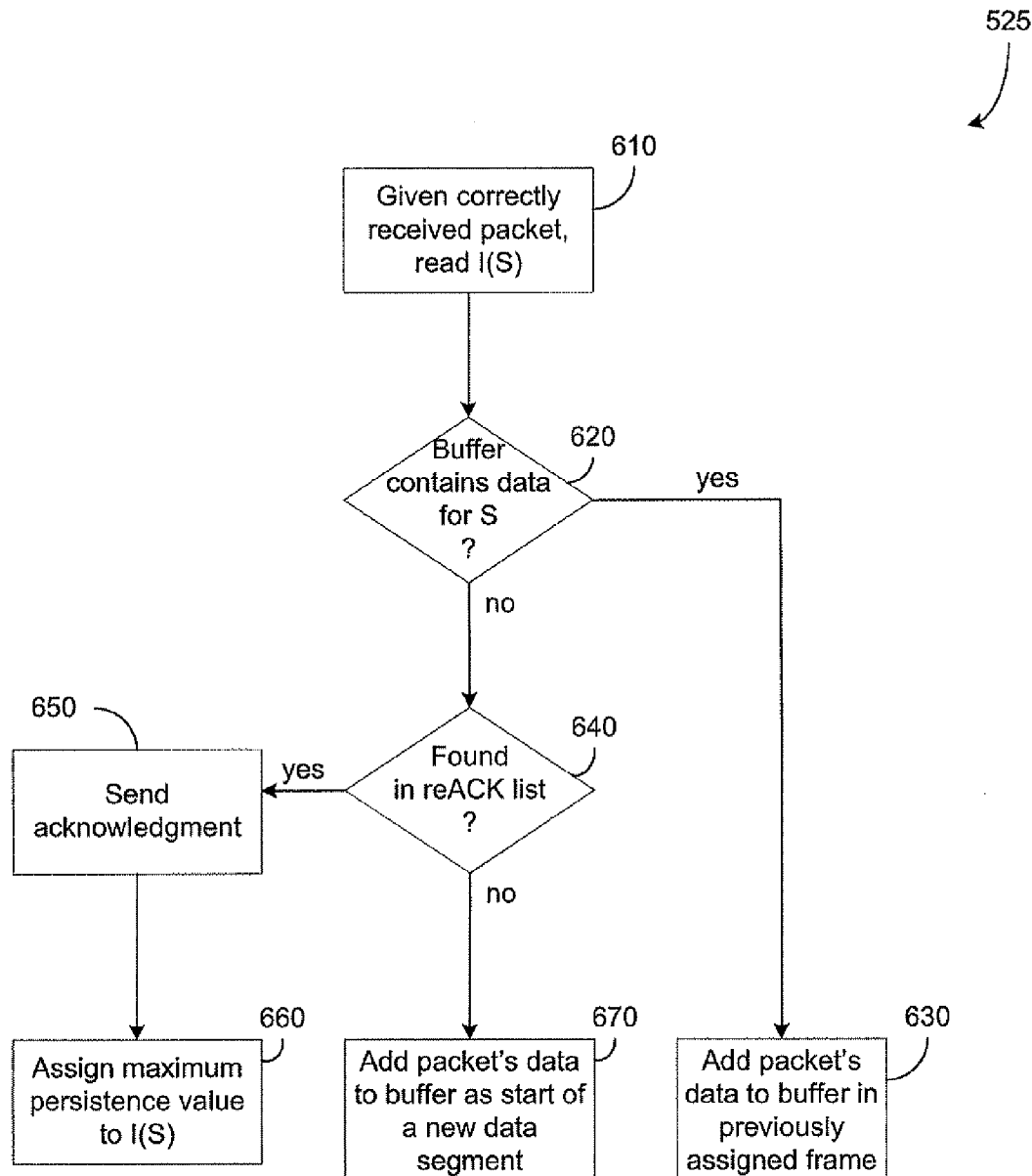
FIG. 6 is a flowchart illustrating the process for updating the circular buffer at a receive node, according to an embodiment of the invention.

FIG. 6 illustrates circular buffer updating 525 in greater detail, according to an embodiment of the invention. At 610, the data segment identifier I(S) is read from a successfully received packet. At 620, a determination is made as to whether the circular buffer currently contains any data for data segment S. If so, then at 630, the data from the received packet is added to that data segment's frame in the circular buffer.

If, at 620, it is determined that the circular buffer contains no data for this data segment, then at 640 a determination is made as to whether the identifier I(S) is found in the reacknowledgment list. If not, then at 670 the packet is treated as the start of transmissions associated with a new data segment: A new frame is allocated in the circular buffer, and the data for the new data segment is added to that frame. If, at 640, the identifier is found in the reacknowledgment list, then an acknowledgment for the corresponding data segment is sent at 650. At 660, the re-acknowledgment list entry for I(S) is assigned a maximum persistence value.

Figure 7:
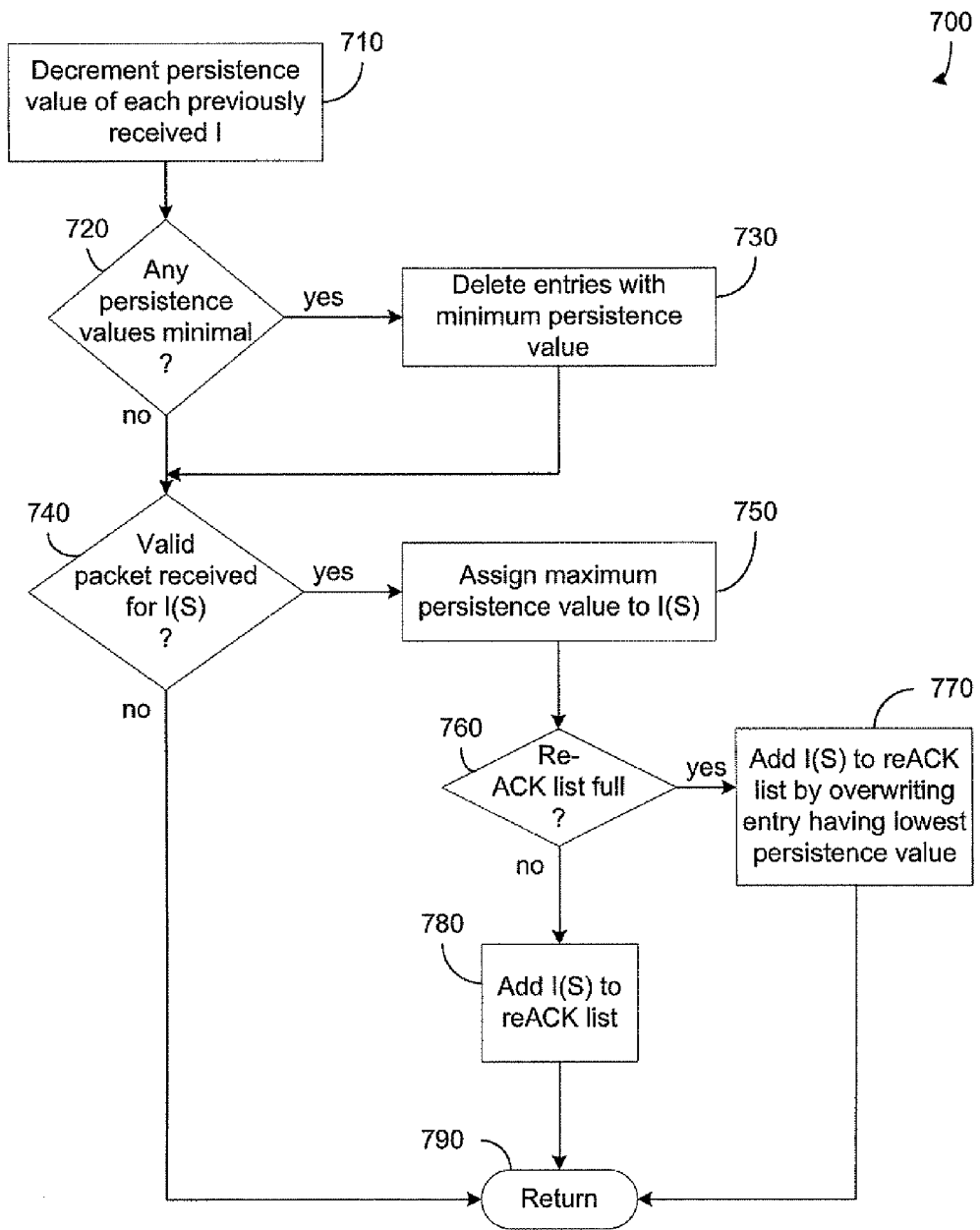
FIG. 7 is a flowchart illustrating the management of a reacknowledgment list at a receive node, according to an embodiment of the invention.

Management of the reacknowledgment list is illustrated in greater detail in FIG. 7. At 710, the persistence value of each previously received identifier I is decremented. At 720, a determination is made as to whether any of the persistence values in the reacknowledgment list has reached a minimum value. If so, then at 730, those identifiers are deleted. At 740, a determination is made as to whether a valid packet has been received for I(S). If so, the maximum persistence value is assigned to I(S) at 750. At 760, a determination is made as to whether the reacknowledgment list is full. If not, then at 780, the identifier is added to the reacknowledgment list. If the list is full, then at 770, the identifier is added to the reacknowledgment list by overwriting the entry in the list having the lowest persistence value.

For the decoding of a data segment, the receive node will have received a set of l packets, $$\bar{p}_1 = F(I(S), \kappa_1, \bar{d}_1),$$

$$p_2 = F(I(S), \kappa_2, \bar{d}_2), \ldots$$

$$\bar{p}_l = F(I(S), \kappa_l, \bar{d}_l)$$

associated with data segment identifier I(S). If D denotes the l×N matrix whose i-th row is $\bar{d}_i$, and A denotes the l×g matrix whose i-th row is $\bar{\alpha}_i(\kappa)$, then D=AS. If A has full rank g (meaning that the matrix has g rows that are linearly independent over the finite field $GF(2^m)$), then it contains a g×g submatrix Λ that is invertible over the finite field. This property allows the receive node to decode the data segment through the equation $S=\Lambda^{-1}D_\Lambda$, where $\Lambda^{-1}$ is the inverse of Λ and $D_\Lambda$ is the corresponding submatrix of D (i.e., the row numbers used to extract $D_\Lambda$ from D are the same as the row numbers used to extract Λ from A). The determination of the rank of the matrix A, the identification of its full-rank submatrix Λ, and the computation of the inverse matrix $\Lambda^{-1}$ are performed using well-known techniques from linear algebra, such as Gaussian elimination over the finite field $GF(2^m)$.

Figure 8:
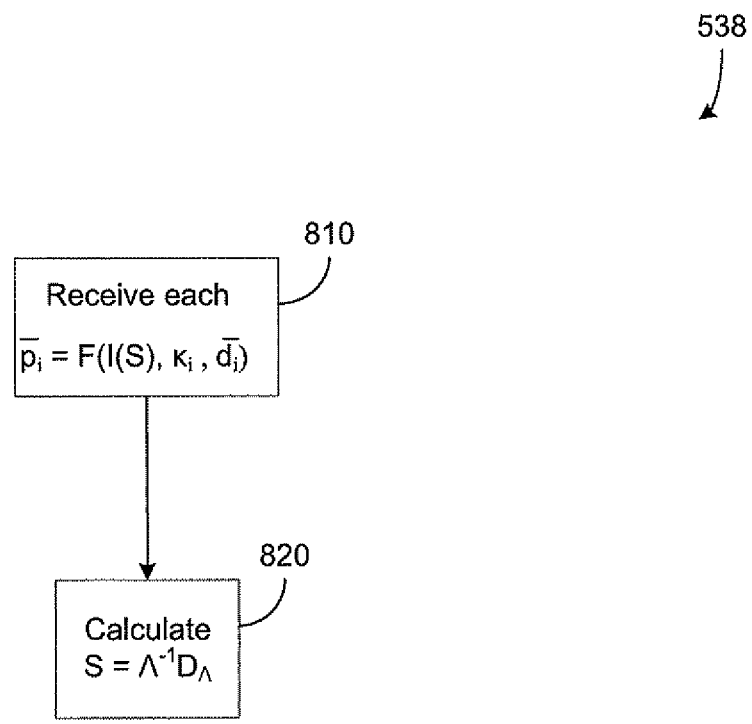
FIG. 8 is a flowchart illustrating the reconstruction of a data segment as performed at a receive node, according to an embodiment of the invention.
Figure 9:
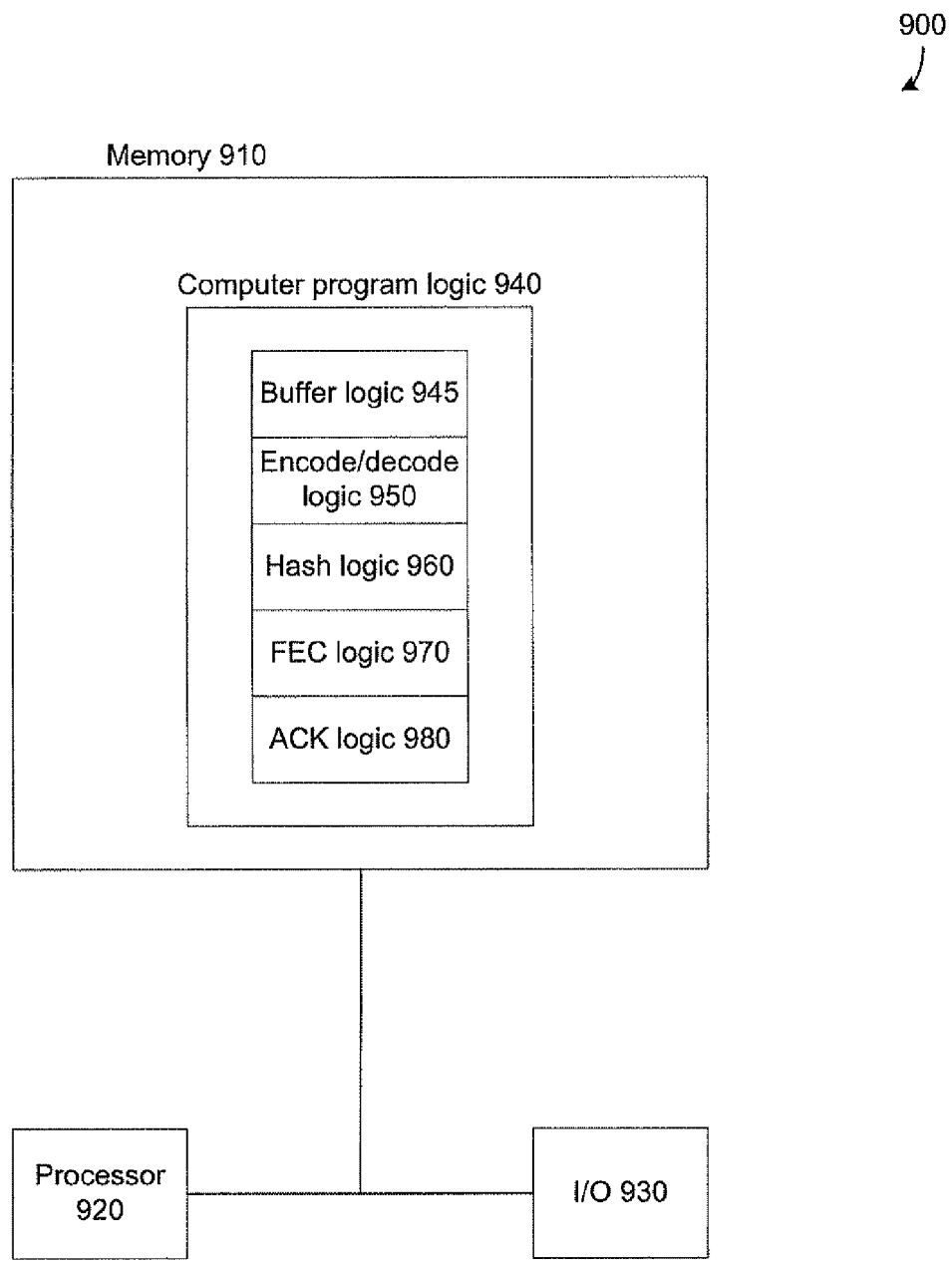
FIG. 9 is a block diagram illustrating a software or firmware embodiment of the invention.

This decoding of a data segment (538 in FIG. 5) is illustrated in FIG. 8. At 810, the receive node reads each packet $\bar{p}_i = F(I(S), \kappa_i, \bar{d}_i)$. At 820, the data segment S is recovered by calculating $S=\Lambda^{-1}D_\Lambda$.

Note that in order to save memory, the receive node need only keep track of contributing packets, i.e., any packet whose coefficient vector $\bar{\alpha}(\kappa)$, when added to the current version of A, increases the rank of this matrix. The receiving node can perform this check as part of the circular buffer updating 525 and thus only store the data in the circular buffer when it has been verified that the data is from a contributing packet.

The processing described above for the transmit and receive nodes may be implemented using digital logic in the form of software, firmware, or hardware, or some combination thereof. A hardware implementation may take the form of one or more field programmable gate arrays (FPGAs) for example. Alternatively, a hardware implementation may take the form of one or more application specific integrated circuits (ASICs) or other forms of hardware logic, as would be understood by a person of ordinary skill in the art.

The term software, as used herein, refers to a computer program product including a computer readable medium having computer program logic stored therein to cause a computer system to perform one or more features and/or combinations of features disclosed herein. A software embodiment is illustrated in the context of a computing system 900 in FIG. 9. System 900 may include a processor 920 and a body of memory 910 that may include one or more computer readable media that may store computer program logic 940. Memory 910 may be implemented as random access memory (RAM), read-only memory (ROM) or some combination thereof, for example. Processor 920 and memory 910 may be in communication using any of several technologies known to one of ordinary skill in the art, such as a bus. Computer program logic 940 is contained in memory 910 and may be read and executed by processor 920. One or more I/O ports and/or I/O devices, shown collectively as I/O 930, may also be connected to processor 920 and memory 910. Computing system may be incorporated in one or both of a transmission node or a receive node.

Computer program logic 940 includes buffer logic 945. In an embodiment of the invention, this function is responsible for managing the circular buffer. It accepts data segments from the source, finds appropriate storage for the data segments in the circular buffer, assigns the data segment identifiers, assigns and updates seed values associated with the data segments, determines the data segments to be processed for each transmission opportunity, and serves as the interface for the encode/decode logic 950 to the data segment's data.

Computer program logic 940 also includes encode/decode logic 950. In an embodiment of the invention, this body of logic is responsible for the encoding of packets and decoding of data as described above. While this is shown as a single body of logic in the illustrated embodiment, separate encode and decode logic may be used in alternative embodiments.

Computer program logic 940 also includes hash logic 960. Hash logic 960 is responsible for generating a hash value as described above in the context of a transmit node. In a receive node, hash logic 960 is responsible for generating a hash value and comparing that value to the received hash in a given received packet.

Computer program logic 940 also includes forward error correction logic 970. This logic is responsible for applying the error correction coding process at a transmit node, which includes the channel coding and channel interleaving. In a receive node, forward error correction logic 970 is responsible for performing the analogous inverse operations: channel de-interleaving and channel decoding. While this is shown as a single module in the illustrated embodiment, the channel encoding/decoding and the channel interleaving/de-interleaving may be implemented as separate modules in alternative embodiments.

Computer program logic 940 also includes acknowledgement logic 980. In an embodiment of the invention, this body of logic is responsible for processing related to acknowledgement messages sent or received as described above. At the receive node, for example, this body of logic is responsible for the acknowledgment processing illustrated in the embodiment of FIG. 6 and for the management of a reacknowledgment list as shown in the embodiment of FIG. 7.

Computer program logic 940 may be implemented using any of a variety of computer programming languages known to persons or ordinary skill in the art. Such languages include, for example and without limitation, C, C++, or assembly language, or some combination thereof.

Figure 10:
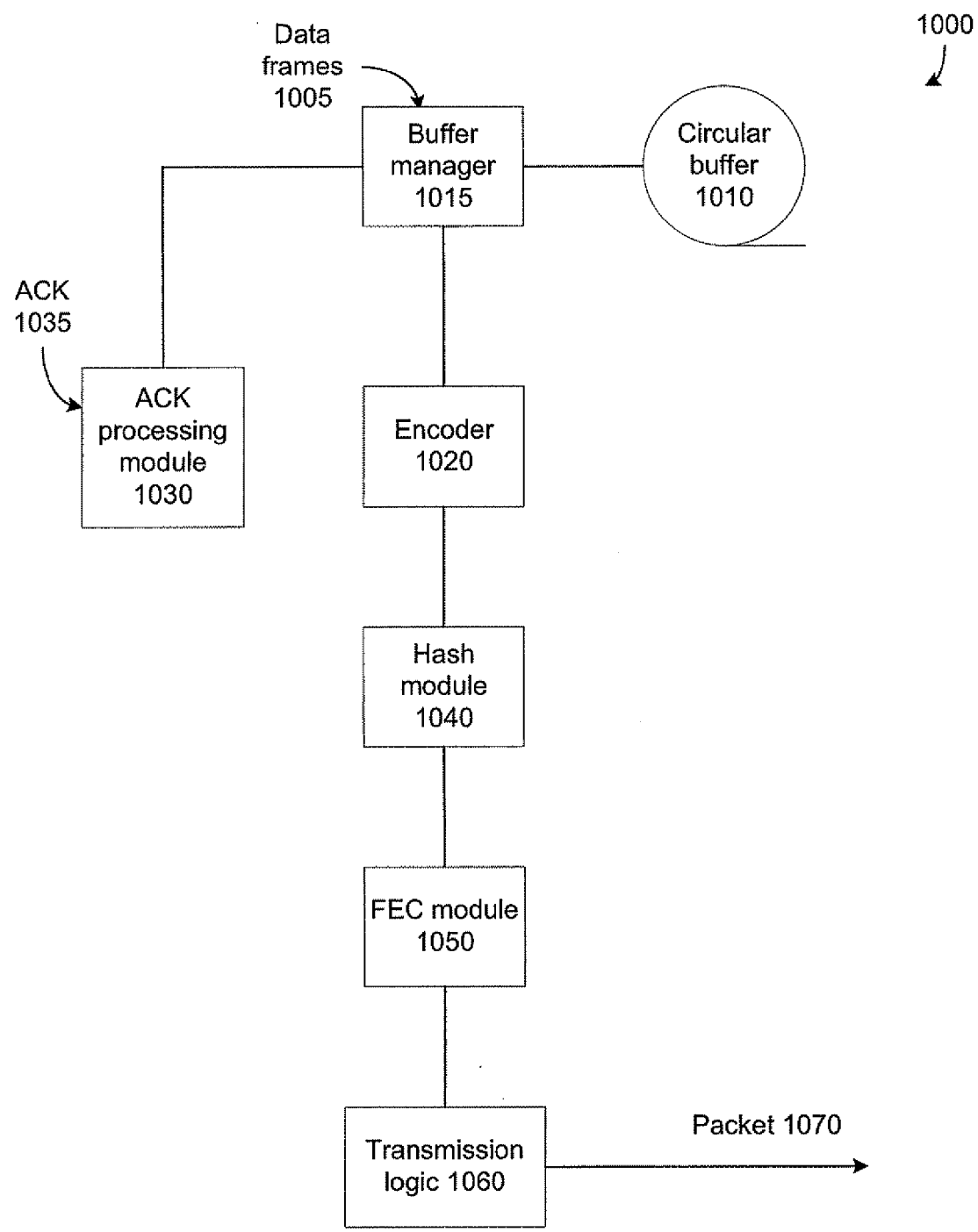
FIG. 10 is a block diagram illustrating the structure of an embodiment of the invention at a transmission node.

The structure of the invention in the context of a transmit node is illustrated in FIG. 10, according to an embodiment. Buffer manager 1015 is responsible for operations associated with maintenance of the circular buffer 1010. Data segments 1005 from the source are presented to the buffer manager 1015, which allocates storage in the circular buffer and performs various associated bookkeeping functions such as assignment of segment identifiers and initial seed values. The buffer manager 1015 also determines the data segment to be processed at each transmission opportunity and provides the data segment data to encoder 1020. The encoding of data segments is performed by encoder 1020. The buffer manager 1015 is also in communication with an acknowledgment processing module 1030. An acknowledgment 1035 is received by acknowledgment processing module 1030. As discussed above, receipt of an acknowledgment by the acknowledgment processing module 1030 prompts the buffer manager 1015 to delete the corresponding data segment and associated parameters from the circular buffer 1010, since that data segment has been successfully delivered to the destination.

The calculation of a hash value on the basis of an encoded packet is performed by hash module 1040. A forward error correction module 1050 performs error correction coding and channel interleaving. The remaining transmission infrastructure is shown generically as transmission logic 1060. This latter component may include, for example, additional protocol processing related to other protocol layers, including but not limited to physical layer processing.

Figure 11:
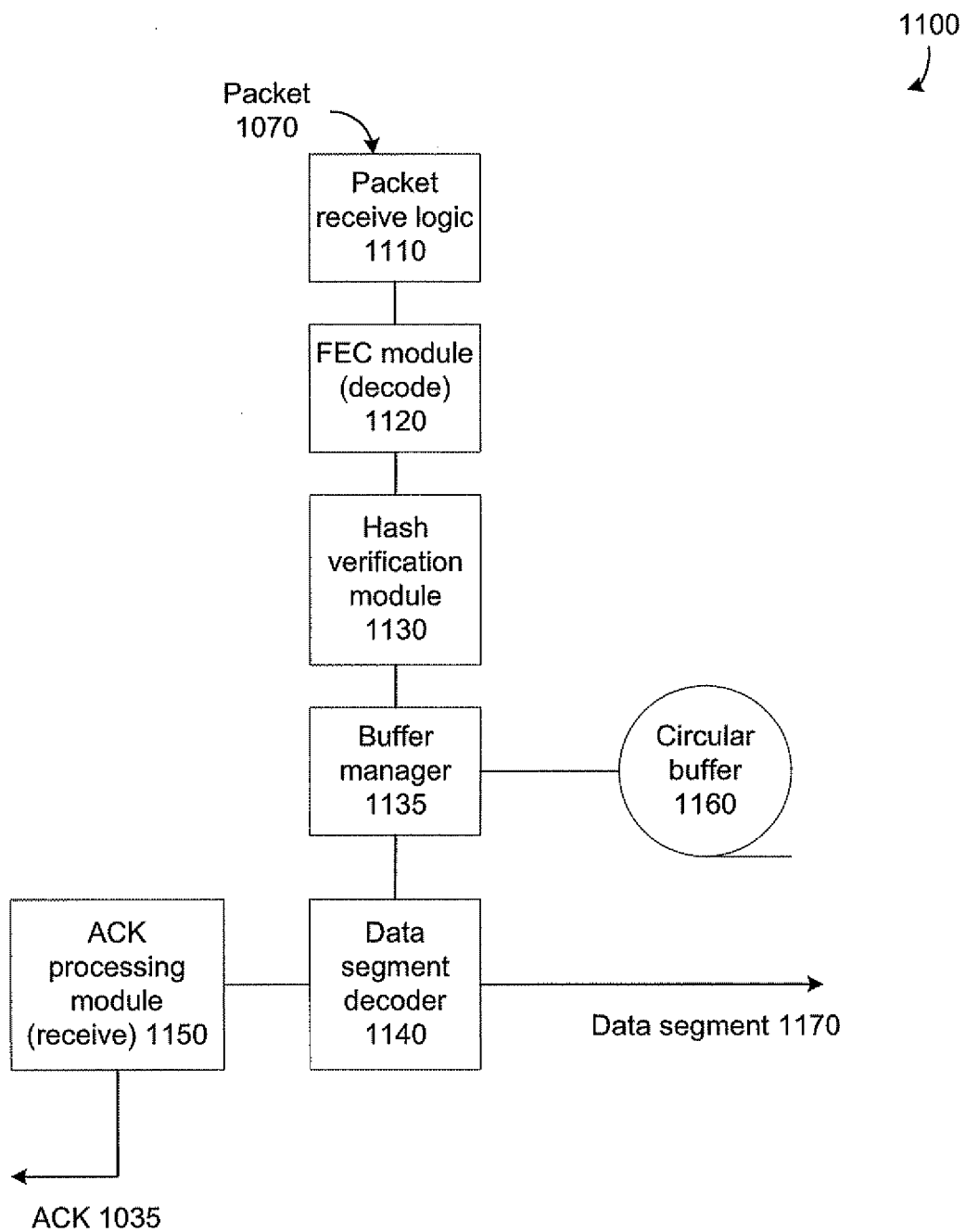
FIG. 11 is a block diagram illustrating the structure of an embodiment of the invention at a receive node.

At a receive node, the invention may be structured as shown in FIG. 11, according to an embodiment. A packet 1070 is received by logic 1110, which may include logic for processing additional protocol layers for example. A forward error correction module 1120 is responsible for performing channel de-interleaving and channel decoding. A hash verification module 1130 is responsible for calculating a hash value for the received packet and comparing this hash value to the received hash. If the two hash values are in agreement, the packet is considered to have been correctly received and decoded. Data from the decoded packet is delivered to the buffer manager 1135, which determines the frame in circular buffer 1160 to which the data belongs based on the decoded data segment identifier. In the event that no frame is currently assigned to that identifier, the buffer manager 1135 allocates new storage in the circular buffer 1160. The buffer manager 1135 then provides the corresponding frame and its data to the data segment decoder 1140. Decoding of a data segment is performed by module 1140, according to the logic described above. This includes determination of whether or not there is sufficient data received to reconstitute the data segment. An acknowledgment processing module 1150 is responsible for performing acknowledgment processing at the receive node. Successful reconstitution of the data segment by the data segment decoder 1140 results in acknowledgment processing module 1150 generating an acknowledgment 1035 for the corresponding data segment. The acknowledgment processing module 1150 also uses and maintains a reacknowledgment list as described above.

Note that in order to achieve reliable transport over a channel that is subject to significant outages, it is desirable to continue to transmit the data segments in the buffer until delivery is positively acknowledged and, if consistent with system and user requirements, to throttle back the flow of data segments from the source to avoid overwriting the circular buffer when the buffer is full. In an embodiment of the invention, the flow of source data into the circular buffer at the transmit node is controlled using an external first-in-first-out (FIFO) memory. The FIFO holds data awaiting release of buffer space in the circular buffer. This allows data segments to be delivered reliably but in a randomized order determined by the channel outages.

At the receive node, the end user may, however, require data segments be presented in their proper order. This can be accomplished by using an external memory to hold data output from the receiver's circular buffer, this memory being writable by segment identifier and readable in sequential order.

With respect to the circular data buffers, and an embodiment of the invention, the circular buffers are sized in accordance with the two-way propagation delay of the channel between the transmit and receive nodes. It is generally inefficient for a transmit node to have to reprocess a given data segment before any potential acknowledgment for that data segment can be received. If the timing is poor, the transmission node will send the new packet for a data segment that has already been decoded by the receive node. This would be avoided if the transmission node had waited for the acknowledgement to be received. To avoid idling, the transmission node ideally transmits packets from enough different frames to "fill the air" with independent data segments. Thus, in an embodiment of the invention, the circular buffers consist of M frames, where M is substantially equal to or greater than (2D/c)*(R/N), where D is the physical distance between the transmission and receive nodes, c is the speed of light, and R is the symbol transmission rate. Note that this formula is an approximation, given that packet overhead (e.g., hash values, FEC codes, data segment identifiers) is not considered for purposes of this calculation.

The systems shown in FIGS. 10 and 11 may be implemented in a communications component such as a modem. As noted above, an implementation may take the form of software, firmware, or hardware, or any combination thereof as would be understood by a person of ordinary skill in the art. Moreover, alternative arrangements of these modules, other than the arrangements shown, may be used in other embodiments of the invention.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method for processing data for transmission, comprising:

storing data segments from a source as frames of a circular buffer at a transmit node;

producing an encoded data vector from portions of one or more frames in the circular buffer;

formatting a packet containing the encoded data vector;

transmitting the packet;

when an acknowledgment of a receive node receiving a frame in the circular buffer is received at the transmit node, releasing buffer space used by the frame to store additional data segments from the source such that release of buffer space and corresponding data replacement in the circular buffer at the transmit node occurs based on acknowledged delivery of data segments to the receive node; and when no acknowledgment is timely received, producing a new encoded data vector from portions of said one or more frames in the circular buffer at the transmit node, formatting a new packet containing the new encoded data vector, and transmitting the new packet, wherein a data segment S consists of vectors $\bar{s}_1, \bar{s}_2, \bar{s}_3, \ldots, \bar{s}_g$ where each $\bar{s}_i$ is an N-tuple of elements from finite Galois field $GF(2^m)$, and said producing an encoded vector comprises:

choosing a pseudorandom vector $\bar{\alpha}(\kappa) = \alpha_1(\kappa), \alpha_2(\kappa), \ldots \alpha_g(\kappa)$ of coefficients from the field $GF(2^m)$ based on a seed $\kappa = \kappa(S)$;

computing a data payload $\bar{d} = \Sigma \alpha_i(\kappa) \bar{s}_i$, where i=1, ... g; and generating the packet as $\bar{p} = F(I(S), \kappa, \bar{d})$ in accordance with formatting function F, where I(S) is an identifier of the data segment contained in the frame.

2. The method of claim 1, wherein said circular buffer is implemented as a linked list, and said the storing of the frame in the buffer comprises:

reading a pointer at the end of the linked list; and adding the frame at the location indicated by the pointer, wherein, when the circular buffer is full or there is no frame to be added to the circular buffer, pointers in the linked list are rotated, such that an immediate successor of an original head pointer becomes a new head pointer, and the original head pointer becomes a new tail pointer.

3. The method of claim 1, wherein the pseudorandom vector is generated recursively.

4. The method of claim 1, wherein said generating of the packet in accordance with the formatting function comprises:
calculating a hash of the packet; and
transmitting the hash along with the packet.

5. The method of claim 4, further comprising:
applying a forward error correction (FEC) to the packet and the hash, wherein the FEC uses channel interleaving to randomly distribute error bursts.

6. A system for processing data for transmission, comprising:
a circular buffer at a transmit node, the circular buffer being configured to store data segments as frames;
an encoder configured to receive a data segment of a frame from said circular buffer, encode a data vector from said data segment, and format a packet containing said encoded data vector; and
an acknowledgment processing module, configured to receive, at the transmit node, an acknowledgment of receipt of said frame by a receive node, when said acknowledgment is timely received, to initiate release, in said circular buffer at the transmit node, of space occupied by said frame to allow storage of additional data segments such that release of buffer space and corresponding data replacement in the circular buffer at the transmit node occurs based on acknowledged delivery of data segments to the receive node, and when said acknowledgment is not timely received, to prompt said encoder module to produce a new encoded data vector from portions of said one or more frames in the circular buffer at the transmit node and format a new packet containing the new encoded data vector, wherein said data segment consists of vectors $\bar{s}_1, \bar{s}_2, \bar{s}_3, \ldots \bar{s}_g$ where each $\bar{s}_i$ is an N-tuple of elements from finite Galois field $GF(2^m)$, and said encoder is configured to:
choose a pseudorandom vector $\bar{\alpha}(\kappa)=\alpha_1(\kappa), \alpha_2(\kappa), \ldots \alpha_g(\kappa)$ of coefficients from said field $GF(2^m)$ based on a seed $\kappa=\kappa(S)$;
compute a data payload $\bar{d}=\Sigma\alpha_i(\kappa)s_i$ where i=1, ... g; and
generate said packet as $\bar{p}_i=F(I(S), \kappa_i, \bar{d}_i)$ in accordance with a formatting function F, where I(S) is an identifier of said data segment contained in said frame.

7. The system of claim 6, further comprising a first-in-first-out (FIFO) memory from which frames are read for writing into said circular buffer.

8. The system of claim 6, wherein said circular buffer is implemented as a linked list, such that when adding a new frame to said circular buffer, said circular buffer is configured to store said new frame at a location indicated by a pointer at the end of said linked list,
wherein when there is no new frame to be added to said circular buffer or when said circular buffer is full, pointers in said linked list are rotated, such that an immediate successor of an original head pointer becomes a new head pointer, and said original head pointer becomes a new tail pointer.

9. The system of claim 6, wherein said circular buffer has a capacity for M frames, where M is substantially equal to (2D/c)*(R/N), where D is the distance between transmit and receive nodes;
c is the speed of light; and
R is the symbol transmission rate.

10. The system of claim 6, wherein said encoder comprises logic configured to recursively generate said pseudorandom vector.

11. The system of claim 6, further comprising a hash module configured to generate a hash of said payload, wherein said hash is transmitted along with said payload.

12. The system of claim 11, further comprising a forward error correction (FEC) module configured to apply an FEC to said payload and to said hash, wherein said FEC module is configured to use channel interleaving to randomly distribute error bursts.

13. The system of claim 6, wherein said circular buffer, said encoder, and said acknowledgment processing module are incorporated in a modem.

14. A computer program product comprising a non-transitory machine-readable storage medium having computer program logic stored thereon for causing a processor to process data for transmission, the computer program logic comprising:
logic configured to cause the processor to store data segments from a source as frames of a circular buffer at a transmit node;
logic configured to cause the processor to produce an encoded data vector from portions of one or more frames in the circular buffer;
logic configured to cause the processor to transmit the packet;
logic configured to cause the processor to release buffer space used by a frame associated with a data segment when an acknowledgment of a receive node receiving the data segment is received at the transmit node, to store additional data segments from the source such that release of buffer space and corresponding data replacement in the circular buffer at the transmit node occurs based on acknowledged delivery of data segments to the receive node; and
logic configured to cause the processor to produce a new encoded vector from portions of the one or more frames in the circular buffer at the transmit node, format a new packet containing the new encoded data vector, and retransmit the new packet when no acknowledgment is timely received,
wherein a data segment S consists of vectors $\bar{s}_1, \bar{s}_2, \bar{s}_3, \ldots \bar{s}_g$ where each $\bar{s}_i$ is an N-tuple of elements from finite Galois field $GF(2^m)$, and said producing a new encoded vector comprises:
choosing a pseudorandom vector $\bar{\alpha}(\kappa)=\alpha_1(\kappa), \alpha_2(\kappa), \ldots \alpha_g(\kappa)$ of coefficients from the field $GF(2^m)$ based on a seed $\kappa=\kappa(S)$;
computing a data payload to $\bar{d}=\Sigma\alpha_i(\kappa)\bar{s}_i$ where i=1, ... g; and
generating the packet as $\bar{p}=F(I(S), \kappa, \bar{d})$ in accordance with formatting function F, where I(S) is an identifier of the data segment contained in the frame.

15. A method of processing received packets, comprising:
receiving a packet $\bar{p}_i=F(I(S), \kappa_i, \bar{d}_i)$, where I(S) is an identifier of a data segment S from which data is read to form payload $\bar{d}_i$, and $\kappa_i$ is a seed value $\kappa_i(S)$ updated for each packet associated with data segment S;
when a circular buffer for received data is found to contain data from data segment S, adding the data of $d_i$ to the circular buffer; and
when the circular buffer contains no data from data segment S, determining if I(S) is found in a re-acknowledgment list;
when I(S) is not found in the reacknowledgment list, treating the packet as the start of a new data segment; and
when I(S) is found in the reacknowledgment list, sending an acknowledgment of receipt of data segment S and assigning a maximum persistence value to I(S) for storage in the reacknowledgment list.

16. The method of claim 15, further comprising:
when enough packets are received to allow decoding of data segment S, decoding the data segment S; and
adding I(S) to the reacknowledgment list.

17. The method of claim 16, wherein said decoding comprises calculating $S=\Lambda^{-1}D_\Lambda$, where
D is the l×N matrix whose i-th row is $\bar{d}_i$,
A is an l×g matrix whose i-th row is $\alpha_i(\kappa_i)$ where A contains an invertible g×g submatrix $\Lambda$, and where $\alpha_i(\kappa_i)$ is a component of a pseudorandom vector $\bar{\alpha}(\kappa)=\alpha_1(\kappa)$, $\alpha_2(\kappa), \ldots \alpha_g(\kappa)$ of coefficients from the finite Galois field $GF(2^m)$ based on a seed x(S); and
$D_\Lambda$ is a sub matrix of D corresponding to $\Lambda$.

18. The method of claim 17, wherein when a packet $\bar{p}_i=F(I(S), \kappa_i, \bar{d}_i)$ is received, the packet is only kept when $\alpha_i(\kappa_i)$, when added to A, increases the rank of A.

19. The method of claim 15, further comprising managing the reacknowledgment list, wherein said managing comprises:
decrementing the persistence values of previous entries in the reacknowledgement list;
when any persistence value reaches a minimum value, deleting the associated entry;
when a new packet $\bar{p}_i=F(I(S), \kappa_i, \bar{d}_i)$ is received, assigning the maximum persistence value to I(S); and
adding I(S), with its persistence value, to the reacknowledgment list where, when the reacknowledgment list is full, I(S) is added to the reacknowledgement list by overwriting the entry in the reacknowledgement list having the lowest persistence value.

20. A system for processing received packets, comprising:
a decoder configured to decode a data segment S given a set of packets $\bar{p}_i=F(I(S), \kappa_i, \bar{d}_i)$, where I(S) is an identifier of said data segment S and $\kappa_i$ is a seed value $\kappa_i(S)$ updated for each packet associated with data segment S;
a circular data buffer configured to receive data contained in $\bar{d}_i$, wherein said data in $\bar{d}_i$ is from said data segment S; and
an acknowledgment processing module configured to determine, when the circular buffer contains no data that is part of that data segment S, if I(S) is found in a reacknowledgment list, wherein
when I(S) is not found in the reacknowledgment list, $\bar{p}_i$ is treated as the start of a new data segment, and
when I(S) is found in the reacknowledgment list, an acknowledgement for data segment S is sent and a maximum persistence value is assigned to I(S) in the reacknowledgment list.

21. The system of claim 20, wherein said decoder is configured to decode said data segment S when enough data packets are received to allow decoding of said data segment S; and said acknowledgment processing module is configured to add I(S) to send reacknowledgment list.

22. The system of claim 21, wherein said decoder is configured to calculate $S=\Lambda^{-1}D_\Lambda$, where D is the l×N matrix whose i-th row is $\bar{d}_i$, A is an l×g matrix whose i-th row is $\alpha_i(\kappa_i)$ where A contains an invertible g×g submatrix $\Lambda$, and where $\alpha_i(\kappa_i)$ is a component of a pseudorandom vector $\bar{\alpha}(\kappa)=\alpha_1(\kappa)$, $\alpha_2(\kappa), \ldots \alpha_g(\kappa)$ of coefficients from the finite Galois field $GF(2^m)$ based on a seed $\kappa(S)$; and
$D_\Lambda$ is a sub matrix of D corresponding to $\Lambda$.

23. The system of claim 22, wherein said decoder is configured to keep the received packet $\bar{p}_i=F(I(S), \kappa_i, \bar{d}_i)$ only when $\alpha_i(\kappa_i)$, when added to A, increases the rank of A.

24. The system of claim 20, wherein said acknowledgment processing module is configured to manage said reacknowledgement list by performing the following:
decrementing the persistence values of previous entries in the reacknowledgement list;
when any persistence value reaches a minimum value, deleting the associated entry;
when a new packet $\bar{p}_i=F(I(S), \kappa_i, \bar{d}_i)$ is received, assigning the maximum persistence value to I(S); and
adding I(S), along with its persistence value, to the reacknowledgment list where, when the reacknowledgment list is full, I(S) is added to the reacknowledgement list by overwriting the entry in the reacknowledgement list having the lowest persistence value.

25. A computer program product comprising a non-transitory machine-readable storage medium having computer program logic stored thereon for causing a processor to perform frame synchronization, the computer program logic comprising:
logic configured to cause the processor to receive a packet $\bar{p}_i=F(I(S), \kappa_i, \bar{d}_i)$, where I(S) is an identifier of a data segment S from which data is read to form payload $\bar{d}_i$, and $\kappa_i$ is a seed value $\kappa_i(S)$ updated for each packet associated with data segment S;
logic configured to cause the processor to add the data of $\bar{d}_i$ to the circular buffer when a circular buffer for received data is found to contain data from data segment S; and
logic configured to cause the processor to perform the following when the circular buffer contains no data from data segment S:
determine if I(S) is filed in a re-acknowledgment list;
when I(S) is not found in the reacknowledgment list, treat the packet as the start of a new data segment, and
when I(S) is found in the reacknowledgment list, send an acknowledgment of receipt of data segment S and assigning a maximum persistence value to I(S) for storage in the reacknowledgment list.

* * * * *